Patented Nov. 25, 1947

2,431,496

UNITED STATES PATENT OFFICE 2,431,496

COFFEE POWDER

Samuel Natelson and Max Weiss, Brooklyn, N. Y.

No Drawing. Application April 17, 1945,
Serial No. 588,888

4 Claims. (Cl. 99—71)

This invention relates to a powdered coffee concentrate which has the aroma and body of the original coffee and to methods for preparing same.

While to those skilled in the art, the preparation of a powdered coffee concentrate is not difficult, up to the present time none of these concentrates resemble closely the original coffee from which the concentrate was made. The products which have been produced in the past have been definitely inferior because of the loss of aroma and chemical changes in the proteins, carbohydrates and essential oils during the drying process. The preparation of a liquid extract of good quality is not difficult but when brought to the powdered state, profound changes take place due to the drastic conditions used. At present the liquid concentrate is evaporated under vacuum or spray dried, both of which processes require conditions which are too drastic for so delicate a product. Evaporation under ordinary vacuums which permit the elimination of water so that the coffee is brought to a dry state require temperatures which are too high for the maintenance of the original nature of the coffee extract.

We have devised a method which overcomes this difficulty and produces a coffee powder wherein the proteins have not been denatured, the carbohydrates and oils are essentially in their original state. Our process consists in evaporating the ice after the liquid extract has been frozen to the solid state, the ice is then removed by an extremely high vacuum of less than 300 microns of mercury pressure. In this manner when redissolved, it is found that the proteins, carbohydrates and oils are essentially in their original state and produce a cup of coffee which is hardly distinguishable from the original liquid concentrate from which it was produced. The product produced by our process has a high percentage of the original oils present unchanged.

While coffee powders are often referred to as being soluble in water, we find this is not the case. When prepared by our process, fat globules can be seen emulsified in the coffee when redissolved and the solution exhibits the Tyndall effect. This is true of coffee freshly prepared in the usual manner. We therefore refer to our product as being a coffee powder. While the product appears soluble in water to the ordinary layman, this is not scientifically accurate.

At first, evaporation of the ice does not require as high a vacuum as it does toward the end of the process. This is expected for it is well known that the higher the concentration of solute the lower the vapor pressure. Hence, at the beginning of the process higher pressures may be used, the ice still remaining solid but soon vacuums of better than 300 microns are needed. For best results we prefer to keep the vacuum at less than 300 microns at all times.

We maintain the high vacuum in the system by one of two methods. In one method a condenser is placed between the high vacuum pump and the vacuum drier. This condenser is cooled to approximately minus 55° C. In the second method we interpose a trap between the pump and the vacuum drier containing a salt which will react with the water vapor to form a compound having an extremely low vapor pressure. A suitable salt which may be used is anhydrous calcium sulfate. The vapors from the vacuum chamber pass through this salt, the water vapor is removed and the pump can maintain the vacuum without clogging up with vapors.

In order to accelerate the process, water at approximately 15–40° C. may be passed through the jacket of the vacuum drier at such a rate that the necessary heat is supplied to aid in evaporation but that no melting of the ice takes place.

We have further discovered by diligent research that it is possible to prepare a concentrated extract by evaporation to a point where solid content is from 25 to 85% in concentration and which resembles the original coffee extract. This can be done by a vacuum of the order of 10 mm. of mercury pressure. At no time is the temperature of the liquid allowed above approximately 20° C. This liquid concentrate resembles the original liquid from which it was concentrated rather closely, but is not as good as the original in every detail. If further concentration is attempted at this pressure in order to bring the material to a powdered state, the quality is completely destroyed. We conclude then that in the standard processes the main destruction of the coffee comes about in bringing it down to a powder where higher temperatures are needed. If our process should proceed from this point, namely, by freezing this liquid to a solid state, and then evaporating at less than 300 microns, a fairly good product is produced. While this product does not equal the product evaporated totally by our high vacuum procedure, it is, nevertheless, better than anything that has been produced heretofore. In concentrating coffee to the liquor, we prefer not to go above 50% solids. If other materials have been added, it is practical to go to concentrations of as high as 85% solids.

A modification of our process which permits more rapid evaporation consists in allowing the liquid concentrate or the original extract to enter the high vacuum chamber through a narrow orifice. Under these conditions, the liquor foams up and freezes at the same time, the cooling effect being due to the rapid evaporation of the water as it enters the high vacuum chamber. The ice formed in this way is in a highly divided state and evaporation proceeds more rapidly. In the past other materials such as dextrose, maltose, lactose, starch, etc., and mixtures of the same have been added to retain some of the aroma when bringing the coffee to the dry state. This is not necessary in our process because of the delicate way in which the material is handled, the water being removed while the liquid is in a frozen state at extremely low temperatures.

The addition of whole milk to the coffee concentrate and subsequent evaporation is impractical under the present processes because of the denaturing of the casein in the milk. For example, when commercially dried whole milk is dissolved in water it has a peculiar and objectionable taste because of the casein which has changed so that it is not truly reformed as it was in the original milk. Our process solves this problem. When the milk is added to the coffee, and the mixture is frozen and then subjected to a high vacuum evaporation process, a mixture is produced which has the proteins in almost their original state. When this mixture is added to water, either cold or hot, it disperses instantly and produces a beverage with the original flavor which only a skilled expert could distinguish from the original material before evaporation. If a sweetened complete cup of coffee is desired a sufficient amount of sugar may be added to the mixture of milk and liquid coffee concentrate, and the whole subjected to freezing and evaporation. The powder so produced is easily pressed into tablets and suspends instantly in warm water to produce a complete cup of coffee.

Many people prefer cream in their coffee. When drying of cream takes place by ordinary methods and re-dissolving is attempted, the fats separate in lumps and produce an undesirable product. By our process we have been able to incorporate cream with coffee and sugar, freeze the mix and evaporate under high vacuum. The product obtained suspends in water readily to produce a complete cup of coffee with cream. Apparently the protective colloids around the fat globules are not disturbed by our process. The sugar may be omitted if no sweetening is desired.

Some people prefer coffee without milk. For these people, the sugar is dissolved in the liquid coffee concentrate and the mixture is subjected to our method of evaporation to produce the desired product.

It is preferred by some people to have a coffee concentrate which has a lesser amount of sugar, or some flavor added such as obtained from ordinary commercial maple or corn syrup. These syrups contain certain amounts of dextrose, fructose, sucrose and maltose. By our process these syrups may be added in a desired amount and the mix evaporated to produce a drink which although not coffee is highly tasty. When we refer to syrups in our claims, we mean corn syrup, maple syrup, caramel syrup, molasses and similar articles of commerce having a high carbohydrate (mainly dextrose or maltose or sucrose or fructose or galactose or dextrins or mixtures of the same) content and good sweetening value.

Many of these syrups are available in a powdered state. From the point of view of economy the various dehydrated corn syrups (dextrins and purified dextrose), maple syrup, caramel syrup, molasses, grape sugar and the like may be added. In this manner less water need be removed from the mix. However, we have found that the flavors obtained are not as good as those we obtain when we evaporate them with the coffee by our process. By the usual concomitants of coffee we mean milk or cream or sugar or mixtures of the same. Other sweetening agents such as saccharin or the different sugars are included.

*Example 1*

A liquid coffee extract prepared by a standard procedure is placed in trays. These trays are placed in a refrigerator and the liquid frozen to a solid state. The trays are then transferred to a vacuum drier designed to hold high vacuums. The pump is started and the ice is evaporated until the coffee is in a dry state. The dried powder is removed from the tray and may be stored at room temperature in closed containers.

*Example 2*

A liquid coffee concentrate or extract is cooled to approximately 10° C. and introduced through many nozzles into a large vacuum drier with a cone shaped bottom. As the coffee enters it forms a thick foam which freezes instantly. When the vacuum drier is full with ice foam, the nozzles are shut off and evaporation is continued as in Example 1. When the evaporation is complete, the bottom of the vacuum drier is opened and the powdered coffee in a fluffy condition is dropped into suitable containers.

*Example 3*

A liquid extract of coffee containing from 2 to 15% solids is introduced into a standard spray drying outfit attached to a pump which will maintain a vacuum of 10 mm. Evaporation is so adjusted that a liquid concentrate is obtained at the bottom cone containing from 25 to 85% solids. This is obtained by maintaining a temperature within the drier of no higher than 18° C. by suitable heating on the outside which must not exceed 50° C.

If the pump and condensing system are efficient, temperatures as high as 50° C. may be maintained on the outside. With less efficient pumps, where the evaporation is slower lower temperatures of the order of 20–30° C. must be maintained. The liquid concentrate is drawn from the bottom and dried either as in Example 1 or in Example 2.

*Example 4*

A liquid extract of coffee is mixed with whole milk or skimmed milk in such proportion that the milk solids will be approximately twice the coffee solids (the quantities used are essentially a question of taste). This mixture is then subjected to the evaporation process as described in Example 1 or 2.

*Example 5*

A liquid extract of coffee is mixed with whole milk or skimmed milk as in Example 4 and to this is added a sufficient amount of sugar required for sweetening the ultimate cup of coffee. As an approximation, for every gram of coffee solid we prefer to use 2 grams of milk solids and 8 grams of sucrose. If other sweetening agents are used, such as a syrup, or dextrose, or saccharine, a different amount will be required. The liquid mixture of whole milk, coffee extract and sugar is then evaporated in accordance with Examples 1 or 2.

Example 6

A liquid extract of coffee is mixed with a syrup such as corn syrup or maple syrup in such proportions that the resultant powdered product will have a composition of 50 percent coffee and 50 percent solids from the syrup. This solution of coffee extract and syrup is then subjected to the evaporations as described in Examples 1, 2 or 3.

Example 7

A liquid coffee extract is mixed with cream and sugar in such proportion that the final dry product will have a proportion of solids of one part of coffee to 8 parts of sugar to 1½ parts of cream. The mixture is frozen and dried as in Example 1 or 2.

Example 8

Powdered whole milk or powdered skimmed milk is mixed with sugar and coffee extract in proportions as described in Example 4. The homogeneous mix is spray dried so that the temperature of the mix never goes above 25° C., to a concentration of 25 to 85% solids. The liquid sludge is frozen and dried as in Example 1 or 2.

Having described our invention, we claim:

1. A method for the preparation of a coffee powder, which comprises the introduction of an aqueous coffee extract into a vacuum system, where the pressure is maintained at less than 300 microns, so that the extract foams, the foam is quickly frozen to the solid state and evaporating the ice which is formed in the foam by continuously maintaining the vacuum at less than 300 microns pressure.

2. A method for the preparation of a powder which upon the addition of water will produce a beverage with a coffee flavor which comprises the introduction of an aqueous coffee extract, to which has been added milk and sugar in the proportions found in a complete cup of coffee, into a vacuum system where the pressure is maintained at less than 300 microns, so that the mixture foams, the foam is quickly frozen to the solid state and evaporating the ice which is formed in the foam, by continuously maintaining the vacuum at less than 300 microns pressure.

3. A method for the preparation of a powder which upon the addition of water will produce a beverage with a coffee flavor which comprises the mixing of the liquid coffee extract with corn syrup in an amount less than that necessary to sweeten completely and then introducing the mixture into a vacuum system where the pressure is maintained at from 10 to 300 microns so that the mixture foams, the foam is quickly frozen to the solid state and evaporating the ice which is formed in the foam by continuously maintaining the vacuum at less than 300 microns.

4. A method for the preparation of a powder which upon the addition of water will produce a beverage with a coffee flavor which comprises the mixing of the liquid coffee extract with sucrose in an amount sufficient to sweeten the coffee completely, and then introducing the mixture into a vacuum system where the pressure is maintained at less than 300 microns, so that the mixture foams, the foam is quickly frozen to a solid state and evaporating the ice which is formed in the foam, by continuously maintaining the vacuum at from 10 to 300 microns pressure.

SAMUEL NATELSON.
MAX WEISS.

REFERENCES CITED

The following references are of record in the file of this patent:

UNITED STATES PATENTS

| Number | Name | Date |
| --- | --- | --- |
| 228,889 | Gue | June 15, 1880 |
| 735,777 | Kato | Aug. 11, 1903 |
| 1,478,940 | Chalos | Dec. 25, 1923 |
| 1,504,459 | Washington | Aug. 12, 1924 |
| 1,507,410 | Zorn | Sept. 2, 1924 |
| 1,891,383 | Giffen et al. | Dec. 20, 1932 |
| 2,225,627 | Flosdorf | Dec. 24, 1940 |
| 2,225,774 | Flosdorf | Dec. 24, 1940 |
| 2,278,472 | Musher | Apr. 7, 1942 |
| 2,345,548 | Flosdorf | Mar. 28, 1944 |